United States Patent
Gorai et al.

(10) Patent No.: US 11,689,411 B1
(45) Date of Patent: Jun. 27, 2023

(54) HARDWARE RESOURCE MANAGEMENT FOR MANAGEMENT APPLIANCES RUNNING ON A SHARED CLUSTER OF HOSTS

(71) Applicant: VMWARE, INC., Palo Alto, CA (US)

(72) Inventors: Krishnendu Gorai, Bangalore (IN); Ivaylo Radoslavov Radev, Sofia (BG); Akash Kodenkiri, Bangalore (IN); Anil Narayanan Nair, Bangalore (IN); Ammar Rizvi, Bangalore (IN); Niharika Narasimhamurthy, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/691,153

(22) Filed: Mar. 10, 2022

(30) Foreign Application Priority Data

Jan. 13, 2022 (IN) .............................. 202241002060

(51) Int. Cl.
*G06F 15/173* (2006.01)
*H04L 41/046* (2022.01)
*H04L 67/10* (2022.01)
*G06F 9/50* (2006.01)

(52) U.S. Cl.
CPC .......... *H04L 41/046* (2013.01); *G06F 9/5077* (2013.01); *H04L 67/10* (2013.01); *G06F 2209/5011* (2013.01)

(58) Field of Classification Search
CPC ..... H04L 41/046; H04L 67/10; G06F 9/5077; G06F 2209/5011
See application file for complete search history.

(56) References Cited

U.S. PATENT DOCUMENTS

| | | | |
|---|---|---|---|
| 9,378,044 B1* | 6/2016 | Gaurav ................. | G06F 9/5077 |
| 2010/0228839 A1* | 9/2010 | Pal ........................... | G06F 8/61 |
| | | | 709/221 |

* cited by examiner

*Primary Examiner* — Padma Mundur
(74) *Attorney, Agent, or Firm* — Kim & Stewart LLP

(57) ABSTRACT

A method of reserving hardware resources for management appliances of a software-defined data center (SDDC) that have been deployed onto one or more hosts of a cluster of hosts, includes reserving hardware resources of the cluster for a resource pool that has been created for the management appliances, the hardware resources including at least processor resources of the hosts and memory resources of the hosts, and assigning the management appliances to the resource pool created for the management appliances. The management appliances share the hardware resources of the cluster with one or more other resource pools and, after the steps of reserving and assigning, are allocated at least the hardware resources that have been reserved for the resource pool created for the management appliances.

18 Claims, 7 Drawing Sheets

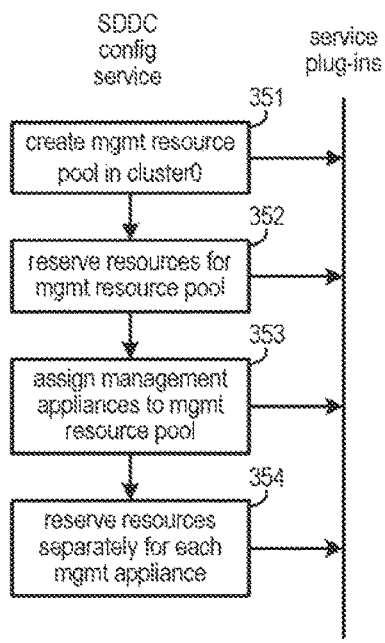

FIGURE 3A

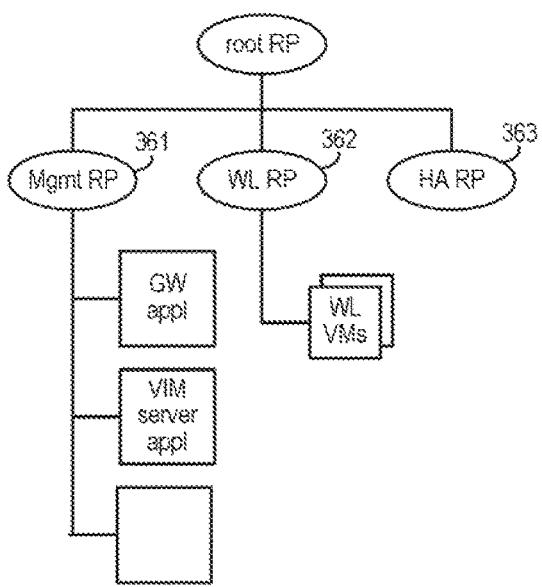

FIGURE 3B

```
{
  "name":"Cluster-0",
  "drs":{
    "automation":{
      "automation_level":"FULLY_AUTOMATED",
      "migration_threshold":3,
      "proactive_drs_enabled":false,
      "virtual_machine_automation":true
    },
    "enabled":true
  },
  "resource_pools":[
    {
      "name":"Management-ResourcePool",
      "config":{
        "memory_allocation":{ },
        "cpu_allocation":{ },
        "storage_allocation":{ }
      },
      "vm":[
        {
          "name":"vCenterVM",
          "vm_type": "VCENTER",
          "config":{
            "memory_allocation":{ },
            "cpu_allocation":{ },
            "storage_allocation":{ }
          }
        },
        {
          "name":"gatewayVM",
          "vm_type": "GATEWAY",
          "config":{
            "memory_allocation":{ },
            "cpu_allocation":{ },
            "storage_allocation":{ }
          }
        }
      ]
    },
    {
      "name":"Workload-ResourcePool",
      "config":{
        "memory_allocation":{ },
        "cpu_allocation":{ },
        "storage_allocation":{ }
      }
    }
  ]
}
```

FIGURE 4

HARDWARE RESOURCE MANAGEMENT FOR MANAGEMENT APPLIANCES RUNNING ON A SHARED CLUSTER OF HOSTS

RELATED APPLICATION

Benefit is claimed under 35 U.S.C. 119(a)-(d) to Foreign Application Serial No. 202241002060 filed in India entitled "HARDWARE RESOURCE MANAGEMENT FOR MANAGEMENT APPLIANCES RUNNING ON A SHARED CLUSTER OF HOSTS", on Jan. 13, 2022, by VMware, Inc., which is herein incorporated in its entirety by reference for all purposes.

BACKGROUND

In a software-defined data center (SDDC), virtual infrastructure, which includes virtual machines (VMs) and virtualized storage and networking resources, is provisioned from hardware infrastructure that includes a plurality of host computers (hereinafter also referred to simply as "hosts"), storage devices, and networking devices. The provisioning of the virtual infrastructure is carried out by management software, referred to herein as virtual infrastructure management (VIM) software, that communicates with virtualization software (e.g., hypervisor) installed in the host computers.

VIM server appliances, such as VMware vCenter® server appliance, include such VIM software and are widely used to provision SDDCs across multiple clusters of hosts, where each cluster is a group of hosts that are managed together by the VIM software to provide cluster-level functions, such as load balancing across the cluster by performing VM migration between the hosts, distributed power management, dynamic VM placement according to affinity and anti-affinity rules, and high availability (HA). The VIM software also manages a shared storage device to provision storage resources for the cluster from the shared storage device.

For customers who have multiple SDDCs deployed across different geographical regions, and deployed in a hybrid manner, e.g., on-premise, in a public cloud, or as a service, the process of managing VIM server appliances across many different locations has proven to be difficult. These customers are looking for an easier way to monitor their SDDCs for compliance with the company policies and manage the upgrade and remediation of such SDDCs. difficult. These customers are looking for an easier way to monitor their SDDCs for compliance with the company policies and manage the upgrade and remediation of such SDDCs.

SUMMARY

One or more embodiments provide cloud services for centrally managing the SDDCs. These cloud services rely on agents running in a cloud gateway appliance that is located in a customer environment, to deliver the cloud services to the customer environment in which the SDDCs are deployed.

One or more embodiments also ensure that management appliances, which include the cloud gateway appliance and VIM server appliances that locally manage the SDDCs, have sufficient hardware resources to perform their management operations. A method of reserving hardware resources for the management appliances of an SDDC that have been deployed onto one or more hosts of a cluster of hosts, according to an embodiment includes reserving hardware resources of the cluster for a resource pool that has been created for the management appliances, the hardware resources including at least processor resources of the hosts and memory resources of the hosts, and assigning the management appliances to the resource pool created for the management appliances. The management appliances share the hardware resources of the cluster with one or more other resource pools and, after the steps of reserving and assigning, are allocated at least the hardware resources that have been reserved for the resource pool created for the management appliances.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 3A is a flow diagram that depicts the steps of setting up a management resource pool for a management cluster and assigning management appliances to the management resource pool.

FIG. 3B is schematic diagram of resource pools that have been set up for the management cluster.

FIG. 4 is a sample desired state document in JSON format.

DETAILED DESCRIPTION

A cloud control plane is employed in the embodiments for centrally managing SDDCs, which may be of different types and which may be deployed across different geographical regions. The cloud control plane relies on agents running locally in the SDDCs to establish cloud inbound connections with the cloud control plane, retrieve from the cloud control plane various tasks to perform on the SDDCs, and delegate the tasks to a local control plane.

Embodiments further ensure that management appliances, which include the VIM server appliance and a cloud gateway appliance on which the agents are deployed, have sufficient hardware resources to perform their management operations by setting up a resource pool for the management appliances and reserving the hardware resources needed by the management appliances. In addition, the state of a shared cluster of hosts on which the management appliances are deployed is managed according to a desired state, which is stored in a human readable and editable file, e.g., a JSON (JavaScript Object Notation) file. The desired state specifies an amount of hardware resources to be reserved for different resource pools of the shared cluster, including the resource pool for the management appliances. If the running state of the shared cluster drifts from its desired state, remediation is performed on the shared cluster by applying the desired state to the shared cluster.

Figure 1:
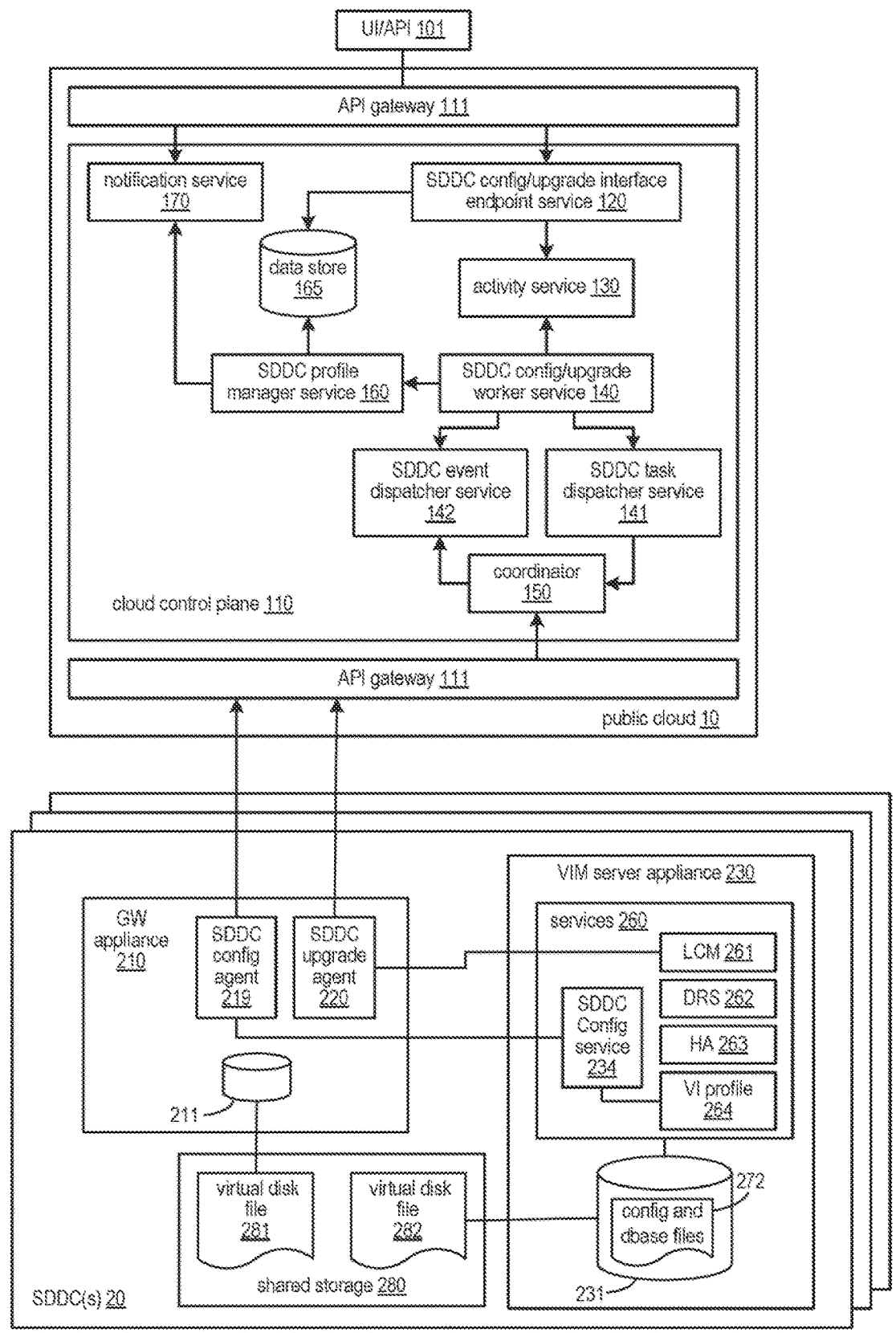
FIG. 1 depicts a cloud control plane implemented in a public cloud, and a plurality of SDDCs that are managed through the cloud control plane, according to embodiments.

FIG. 1 depicts a cloud control plane 110 implemented in a public cloud 10, and a plurality of SDDCs 20 that are managed through cloud control plane 110. In the embodiment illustrated herein, cloud control plane 110 is accessible by multiple tenants through UI/API 101 and each of the different tenants manage a group of SDDCs through cloud control plane 110. In the following description, a group of SDDCs of one particular tenant is depicted as SDDCs 20, and to simplify the description, the operation of cloud control plane 110 will be described with respect to management of SDDCs 20. However, it should be understood that the SDDCs of other tenants have the same appliances, software products, and services running therein as SDDCs 20, and are managed through cloud control plane 110 in the same manner as described below for SDDCs 20.

A user interface (UI) or an application programming interface (API) that interacts with cloud control plane 110 is depicted in FIG. 1 as UI/API 101. Through UI/API 101, an administrator of SDDCs 20 can issue commands to apply a desired state to SDDCs 20 or to upgrade the VIM server appliance in SDDCs 20.

Cloud control plane 110 represents a group of services running in virtual infrastructure of public cloud 10 that interact with each other to provide a control plane through which the administrator of SDDCs 20 can manage SDDCs 20 by issuing commands through UI/API 101. API gateway 111 is also a service running in the virtual infrastructure of public cloud 10 and this service is responsible for routing cloud inbound connections to the proper service in cloud control plane 110, e.g., SDDC configuration/upgrade interface endpoint service 120, notification service 170, or coordinator 150.

SDDC configuration/upgrade interface endpoint service 120 is responsible for accepting commands made through UI/API 101 and returning the result to UI/API 101. An operation requested in the commands can be either synchronous or asynchronous. Asynchronous operations are stored in activity service 130, which keeps track of the progress of the operation, and an activity ID, which can be used to poll for the result of the operation, is returned to UI/API 101. If the operation targets multiple SDDCs 20 (e.g., an operation to apply the desired state to SDDCs 20 or an operation to upgrade the VIM server appliance in SDDCs 20), SDDC configuration/upgrade interface endpoint service 120 creates an activity which has children activities. SDDC configuration/upgrade worker service 140 processes these children activities independently and respectively for multiple SDDCs 20, and activity service 130 tracks these children activities according to results returned by SDDC configuration/upgrade worker service 140.

SDDC configuration/upgrade worker service 140 polls activity service 130 for new operations and processes them by passing the tasks to be executed to SDDC task dispatcher service 141. SDDC configuration/upgrade worker service 140 then polls SDDC task dispatcher service 141 for results and notifies activity service 130 of the results. SDDC configuration/upgrade worker service 140 also polls SDDC event dispatcher service 142 for events posted to SDDC event dispatcher service 142 and handles these events based on the event type.

SDDC task dispatcher service 141 dispatches each task passed thereto by SDDC configuration/upgrade worker service 140, to coordinator 150 and tracks the progress of the task by polling coordinator 150. Coordinator 150 accepts cloud inbound connections, which are routed through API gateway 111, from SDDC upgrade agents 220. SDDC upgrade agents 220 are responsible for establishing cloud inbound connections with coordinator 150 to acquire tasks dispatched to coordinator 150 for execution in their respective SDDCs 20, and orchestrating the execution of these tasks. Upon completion of the tasks, SDDC upgrade agents 220 return results to coordinator 150 through the cloud inbound connections. SDDC upgrade agents 220 also notify coordinator 150 of various events through the cloud inbound connections, and coordinator 150 in turn posts these events to SDDC event dispatcher service 142 for handling by SDDC configuration/upgrade worker service 140.

SDDC profile manager service 160 is responsible for storing the desired state documents in data store 165 (e.g., a virtual disk or a depot accessible using a URL) and, for each of SDDCs 20, tracks the history of the desired state document associated therewith and any changes from its desired state specified in the desired state document, e.g., using a relational database.

An operation requested in the commands made through UI/API 101 may be synchronous, instead of asynchronous. An operation is synchronous if there is a specific time window within which the operation must be completed. Examples of a synchronous operation include an operation to get the desired state of an SDDC or an operation to get SDDCs that are associated with a particular desired state. In the embodiments, to enable such operations to be completed within the specific time window, SDDC configuration/upgrade interface endpoint service 120 has direct access to data store 165.

As described above, a plurality of SDDCs 20, which may be of different types and which may be deployed across different geographical regions, is managed through cloud control plane 110. In one example, one of SDDCs 20 is deployed in a private data center of the customer and another one of SDDCs 20 is deployed in a public cloud, and all of SDDCs are located in different geographical regions so that they would not be subject to the same natural disasters, such as hurricanes, fires, and earthquakes.

Any of the services of described above (and below) may be a microservice that is implemented as a container image executed on the virtual infrastructure of public cloud 10. In one embodiment, each of the services described above is implemented as one or more container images running within a Kubernetes® pod.

In each SDDC 20, regardless of its type and location, a gateway appliance 210 and VIM server appliance 230 are provisioned from the virtual resources of SDDC 20. In one embodiment, gateway appliance 210 and VIM server appliance 230 are each a VM instantiated in one or more of the hosts of the same cluster that is managed by VIM server appliance 230. Virtual disk 211 is provisioned for gateway appliance 210 and storage blocks of virtual disk 211 map to storage blocks allocated to virtual disk file 281. Similarly, virtual disk 231 is provisioned for VIM server appliance 230 and storage blocks of virtual disk 231 map to storage blocks allocated to virtual disk file 282. Virtual disk files 281 and 282 are stored in shared storage 280. Shared storage 280 is managed by VIM server appliance 230 as storage for the cluster and may be a physical storage device, e.g., storage array, or a virtual storage area network (VSAN) device, which is provisioned from physical storage devices of the hosts in the cluster.

Gateway appliance 210 functions as a communication bridge between cloud control plane 110 and VIM server appliance 230. In particular, SDDC configuration agent 219 running in gateway appliance 210 communicates with coordinator 150 to retrieve SDDC configuration tasks (e.g., apply desired state) that were dispatched to coordinator 150 for execution in SDDC 20 and delegates the tasks to SDDC configuration service 234 running in VIM server appliance 230. In addition, SDDC upgrade agent 220 running in gateway appliance 210 communicates with coordinator 150 to retrieve upgrade tasks (e.g., task to upgrade the VIM server appliance) that were dispatched to coordinator 150 for execution in SDDC 20 and delegates the tasks to LCM 261 running in VIM server appliance 230. After the execution of these tasks have completed, SDDC configuration agent 219 or SDDC upgrade agent 220 sends back the execution result to coordinator 150.

Various services running in VIM server appliance 230, including VIM services for managing the SDDC, are depicted as services 260. Services 260 include LCM 261, which is responsible for managing the lifecycle of VIM server appliance 230, e.g., an upgrade of VIM server appliance 230. Distributed resource scheduler (DRS) 262 is a VIM service that is responsible for setting up resource pools and load balancing of workloads (e.g., VMs) across the resource pools. High availability (HA) 263 is a VIM service that is responsible for restarting HA-designated virtual machines that are running on failed hosts of the cluster on other hosts of the cluster. VI profile service 264 is a VIM service that is responsible for applying the desired configuration of the virtual infrastructure managed by VIM server appliance 230 (e.g., the number of clusters, the hosts that each cluster would manage, etc.) and the desired configuration of various features provided by other VIM services running in VIM server appliance 230 (e.g., DRS 262 and HA 263), as well as retrieving the running configuration of the virtual infrastructure managed by VIM server appliance 230 and the running configuration of various features provided by the other VIM services running in VIM server appliance 230. Configuration and database files 272 for services 260 running in VIM server appliance 230 are stored in virtual disk 231.

Figure 2:
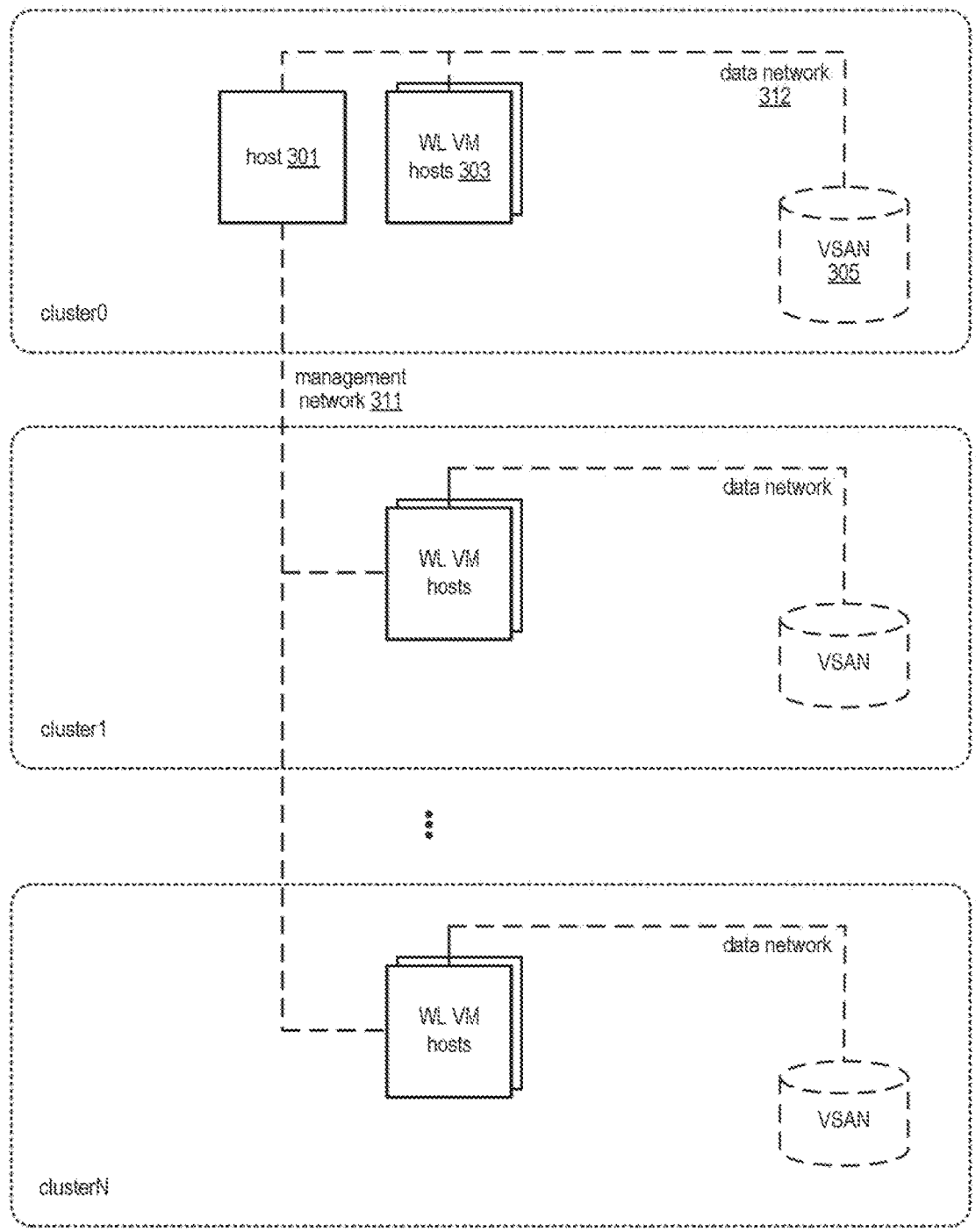
FIG. 2 is a schematic illustration of a plurality of clusters that are managed by a VIM server appliance.

FIG. 2 is a schematic illustration of a plurality of clusters (cluster0, cluster1, . . . , clusterN) that are managed by VIM server appliance 230. Each cluster has physical resources allocated to it. The physical resources include a plurality of host computers, storage devices, and networking devices. In FIG. 2, physical resources are depicted in solid lines and virtual resources provisioned from the physical resources are depicted in dashed lines. In particular, cluster0 includes physical hosts 301, 303, and VSAN device 305 which is provisioned from physical storage devices of hosts 301, 303. In addition, management network 311 and data network 312 of cluster0 are virtual networks provisioned from physical networking devices (e.g., network interface controllers in hosts 301, 303, switches, and routers). The other clusters, cluster1 . . . cluster N, also include physical hosts and virtual SAN devices and virtual networks provisioned from physical resources. As further depicted in FIG. 2, the hosts of cluster0 include a host 301 on which gateway appliance 210 and VIM server appliance 230 are deployed, and a plurality of workload VM hosts 303 on which workload VMs are deployed.

Hereinafter, gateway appliance 210 and VIM server appliance 230 are more generally referred to as "management appliances." Another example of a management appliance is a server appliance that is responsible for managing virtual networks. In the embodiments illustrated herein, these management appliances are deployed on hosts of cluster0, and hereinafter cluster0 is more generally referred to as a management cluster.

In the embodiments, DRS 262 running in VIM server appliance 230 manages the sharing of hardware resources of each cluster (including the management cluster) according to one or more resource pools. When a single resource pool is defined for a cluster, the total capacity of that cluster (e.g., GHz for CPU, GB for memory, GB for storage) is shared by all of the virtual resources (e.g., VMs and VSAN device) provisioned for that cluster. If child resource pools are defined under the root resource pool of a cluster, DRS 262 manages sharing of the physical resources of the cluster by the different child resource pools. In addition, within a particular resource pool, physical resources may be reserved for one or more virtual machines. In such a case, DRS 262 manages sharing of the physical resources allocated to that resource pool, by the virtual machines and any child resource pools.

FIG. 3A is a flow diagram that depicts the steps of setting up a management resource pool for a management cluster and assigning management appliances to the management resource pool to ensure sufficient hardware resources are reserved for the management appliances. These steps are carried out by SDDC configuration service 234 according to a desired state document that specifies the desired state of the management cluster. FIG. 3B is schematic diagram of resource pools that have been set up for the management cluster. FIG. 4 is a sample desired state document in JSON format that is processed by SDDC configuration service 234 prior to issuing a series of instructions 351-354 to one or more service plug-ins of VI profile service 264, which are responsible for applying the desired state of the management cluster specified in the desired state document.

Instruction 351 is issued to create the management resource pool for the management appliances in the management cluster. In the sample desired state document shown in FIG. 4, the management cluster has the name, Cluster-0, and the management resource pool for the management appliances has the name, Management-Resource-Pool. Instruction 352 is issued to reserve hardware resources for the management resource pool. In the sample desired state document shown in FIG. 4, the hardware resource reservations for the management resource pool are depicted generally as: "memory_allocation":{ }, "cpu_allocation": { }, and "storage_allocation": { }. Instruction 353 is issued to assign the management appliances to the management resource pool. In the sample desired state document shown in FIG. 4, the VMs with names, vCenterVM (corresponding to VIM server appliance 230) and gatewayVM (corresponding to gateway appliance 210), are assigned to the management resource pool. Instruction 354 is issued to reserve hardware resources for the individual management appliances. In the sample desired state document shown in FIG. 4, the hardware resource reservations for the individual management appliances are depicted generally as: "memory_allocation":{ }, "cpu_allocation": { }, and "storage_allocation": { }.

In addition to specifying the amount of the particular hardware resource that is reserved, the hardware resource allocations, "memory_allocation": { }, "cpu_allocation": { }, and "storage_allocation": { }, may also specify an upper limit to the hardware resource that can be consumed by the resource pool or VM, and the priority given to the resource pool or VM when there is contention for the shared hardware resource by another resource pool or VM.

In the embodiments, the actual amount of hardware resources that is reserved for the management appliances is equal to at least the amount of hardware resources required by the gateway appliance and the amount of hardware resources required by the VIM server appliance. In some embodiments, the actual amount of hardware resources that is reserved for the management appliances is equal to at least the amount of hardware resources required by the gateway appliance and two times the amount of hardware resources required by the VIM server appliance, so that sufficient hardware resources can be ensured for a migration-based upgrade of the VIM server appliance, which requires an instantiation of a second VIM server appliance.

The schematic diagram of FIG. 3B depicts the management cluster as the root resource pool (root RP). Three resource pools, management resource pool 361, workload VM resource pool 362, and high availability resource pool 363, are created as children resource pools of the root resource pool. The children resource pools share the hardware resources of the management cluster according to their hardware resource allocations. The schematic diagram of FIG. 3B also depicts the VMs that are assigned to the different resource pools. The VMs assigned to management resource pool 361 include the gateway appliance and the VIM server appliance. The spare resource that is reserved from management resource pool 361 for the second VIM server appliance that will be needed for migration-based upgrade of the VIM server appliance, is depicted in FIG. 3B as an empty box. The VMs assigned to workload VM resource pool 362 are workload VMs.

The sample desired state document shown in FIG. 4 also includes settings of DRS 262. The desired settings of DRS 262 specified in the desired state document is applied by a DRS plug-in of VI profile service 264, which provides the service for acquiring the running state of DRS 262 (in response to a GET command from SDDC configuration service 234) and for applying the desired state of DRS 262 specified in the desired state document (in response to a SET command from SDDC configuration service 234).

Figure 5:
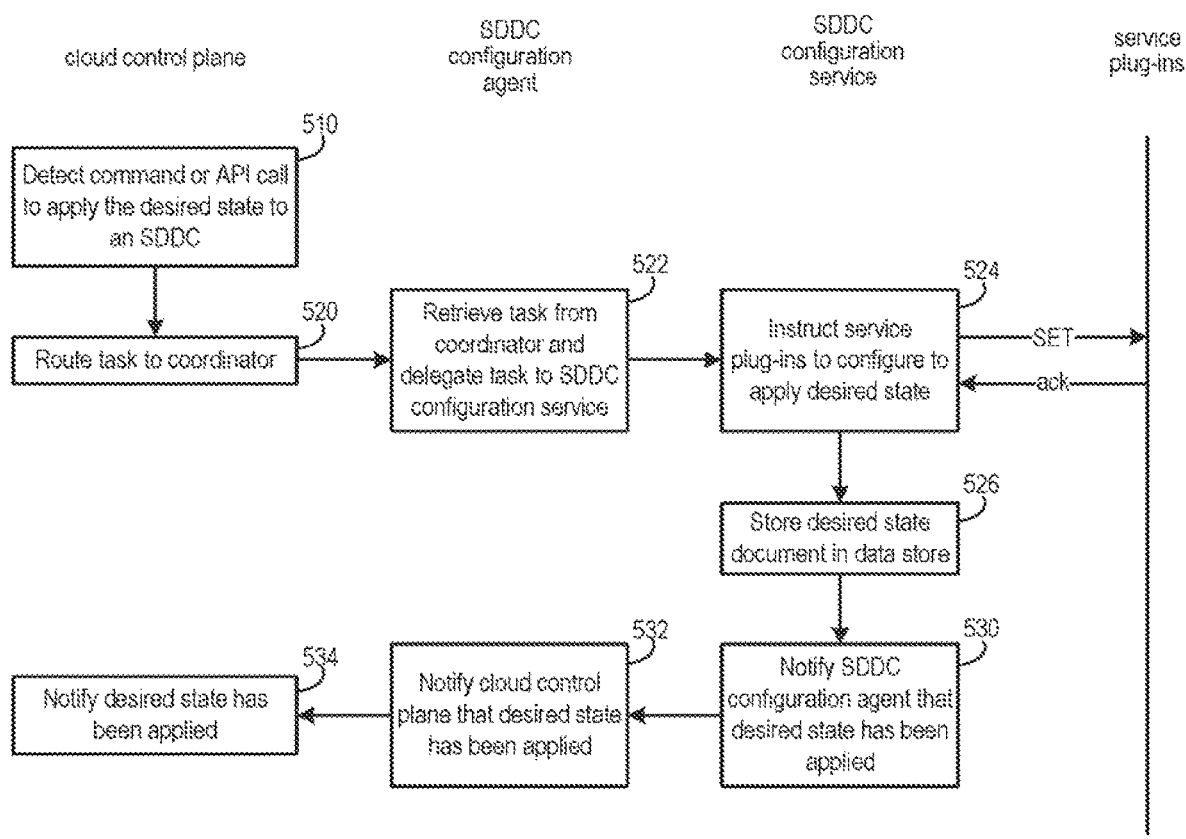
FIG. 5 depicts a sequence of steps carried out to apply the desired state of a management cluster.

FIG. 5 depicts a sequence of steps carried out by cloud control plane 110, SDDC configuration agent 219, and the local control plane to apply the desired state, e.g., desired state of a management cluster, to an SDDC. The steps of FIG. 5 are triggered by a direct command entered by the administrator through UI/API 101 or an API call made through UI/API 101, which specifies the SDDC on which the apply operation is performed (hereinafter referred to as "target SDDC") and the desired state document to apply (step 510). In response to the direct command or API call, SDDC configuration/upgrade interface endpoint service 120 stores the operation requested in the direct command or API call in activity service 130 along with the desired state document SDDC configuration/upgrade interface endpoint service 120 retrieves from data store 165. This operation and the desired state document are passed onto SDDC task dispatcher service 141 by SDDC configuration worker service 140, and SDDC task dispatcher service 141 in turn dispatches the task to perform the apply operation on the target SDDC along with the desired state document, to coordinator 150 (step 520).

At step 522, SDDC configuration agent 219 running in the target SDDC retrieves the dispatched task and the desired state document from coordinator 150 and delegates the task to SDDC configuration service 234. Then, SDDC configuration service 234 at step 524 instructs the service plug-ins (e.g., DRS service plug-in) to set its associated software products/services to the desired state specified in the desired state document, and at step 526 stores the desired state document in data store 226.

SDDC configuration service 234 at step 530 notifies SDDC configuration agent 219 that the desired state has been applied, and SDDC configuration agent 219 at step 532 notifies cloud control plane 110 that the desired state has been applied to the target SDDC. Then, at step 534, notification service 170 provides notification through UI/API 101 that the desired state has been applied.

Figure 6:
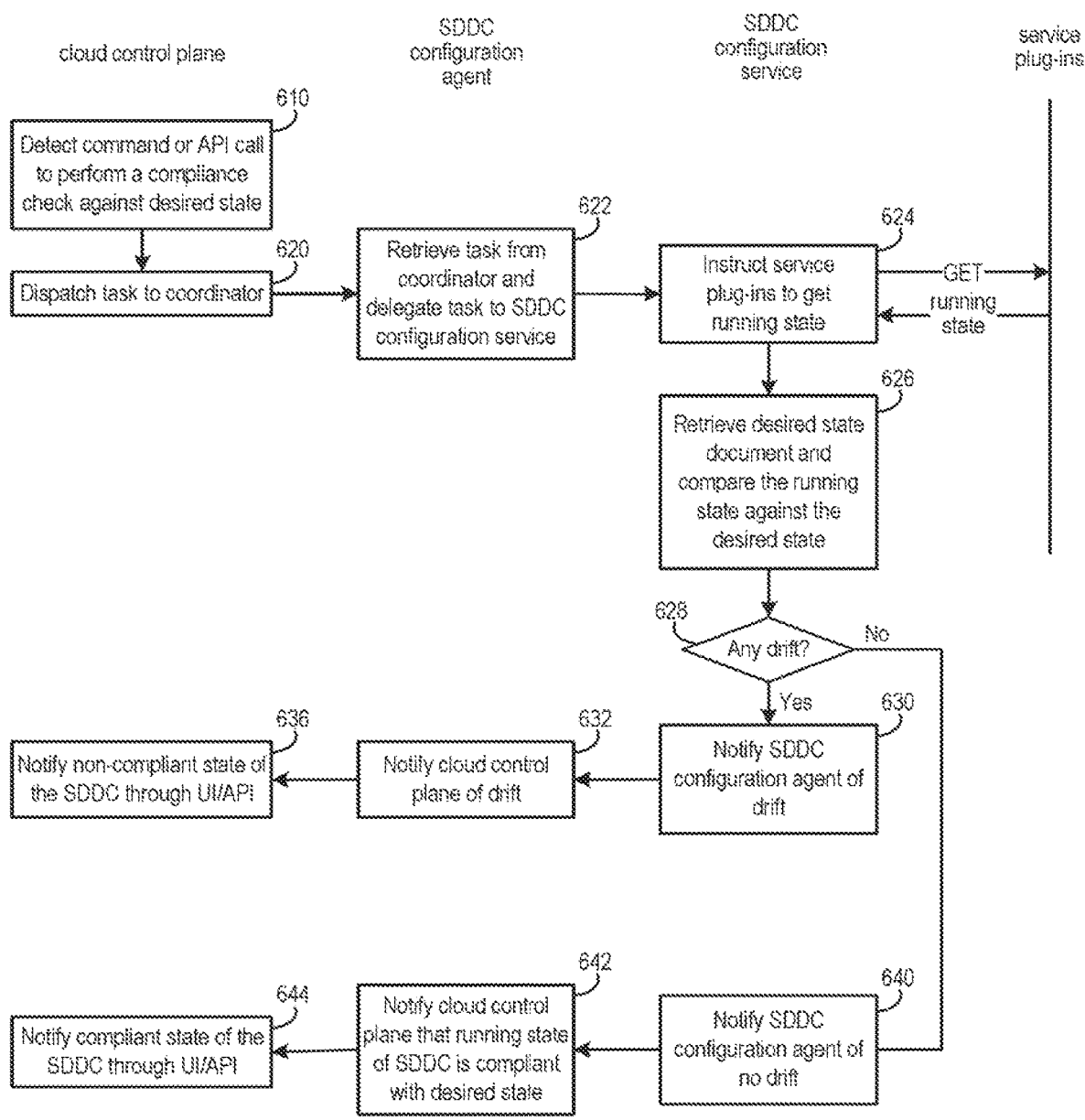
FIG. 6 depicts a sequence of steps carried out to perform a compliance check on the management cluster against the desired state.

FIG. 6 depicts a sequence of steps carried out by cloud control plane 110, SDDC configuration agent 219, and the local control plane to perform a compliance check on an SDDC against the desired state. The steps of FIG. 6 are triggered by a direct command entered by the administrator through UI/API 101 or an API call made through UI/API 101, which specifies the SDDC on which the compliance check is performed (hereinafter referred to as "target SDDC") (step 610). In response to the direct command or API call, SDDC configuration/upgrade interface endpoint service 120 stores the operation requested in the direct command or API call in activity service 130. This operation is passed onto SDDC task dispatcher service 141 by SDDC configuration worker service 140, and SDDC task dispatcher service 141 in turn dispatches the task to perform the compliance check on the target SDDC, to coordinator 150 (step 620).

At step 622, SDDC configuration agent 219 running in the target SDDC retrieves the dispatched task from coordinator 150 and delegates the task to SDDC configuration service 234. Then, SDDC configuration service 234 at step 624 instructs the service plug-ins (e.g., DRS plug-in) to get the running state from its associated software products/services, and at step 626 retrieves the desired state document of the target SDDC stored in data store 226 and compares the running state against the desired state specified in the desired state document.

If, as a result of the comparison, SDDC configuration service 234 detects drift of the running state from the desired state (step 628, Yes), SDDC configuration service 234 at step 630 notifies SDDC configuration agent 219 of the drift. Then, at step 632, SDDC configuration agent 219 sends a notification of the drift event to cloud control plane 110. At step 636, notification service 170 provides notification through UI/API 101 that the running state is non-compliant with the desired state.

If, as a result of the comparison, SDDC configuration service 234 does not detect any drift of the running state from the desired state (step 628, No), SDDC configuration service 234 at step 640 notifies SDDC configuration agent 219 that there is no drift. Then, at step 642, SDDC configuration agent 219 notifies cloud control plane 110 that the target SDDC is compliant with the desired state, and at step 644, notification service 170 provides notification through UI/API 101 that the running state is compliant with the desired state.

In some embodiments, the compliance check described above is carried out on a periodic basis by each of the SDDCs and cloud control plane 110 is notified of any drift in the SDDCs, and the apply operation of FIG. 5 is carried out automatically in response to any such drift notification to remediate the running state of the SDDCs to conform to the desired state.

Figure 7A:
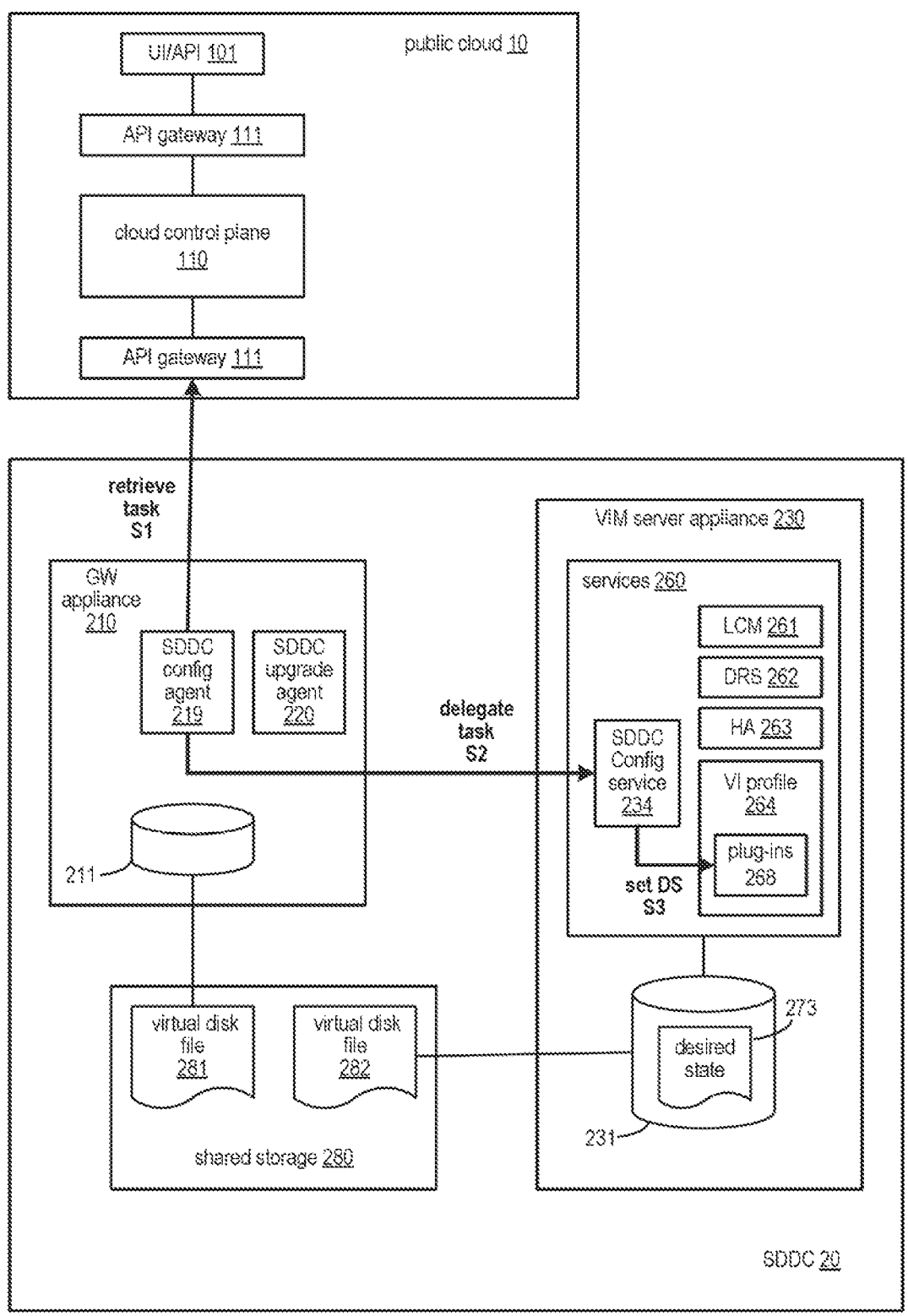
FIG. 7A is a conceptual diagram illustrating the process of applying the desired state of the management cluster.

FIG. 7A is a conceptual diagram illustrating the process of applying the desired state of the management cluster according to embodiments. This process begins at step S1 where SDDC configuration agent 219 retrieves the task to apply the desired state along with the desired state document from cloud control plane 111. Then, at step S2, SDDC configuration agent 219 delegates the task to apply the desired state to SDDC configuration service 234. In response, SDDC configuration service 234 stores the desired state document (depicted in FIG. 7A as desired state document 273), and instructs service plug-ins 268 to set DRS 262 to the DRS settings specified in desired state document 273, set up the resource pools specified in desired state document 273, and to assign management appliances to the management resource pool (step S3).

Figure 7B:
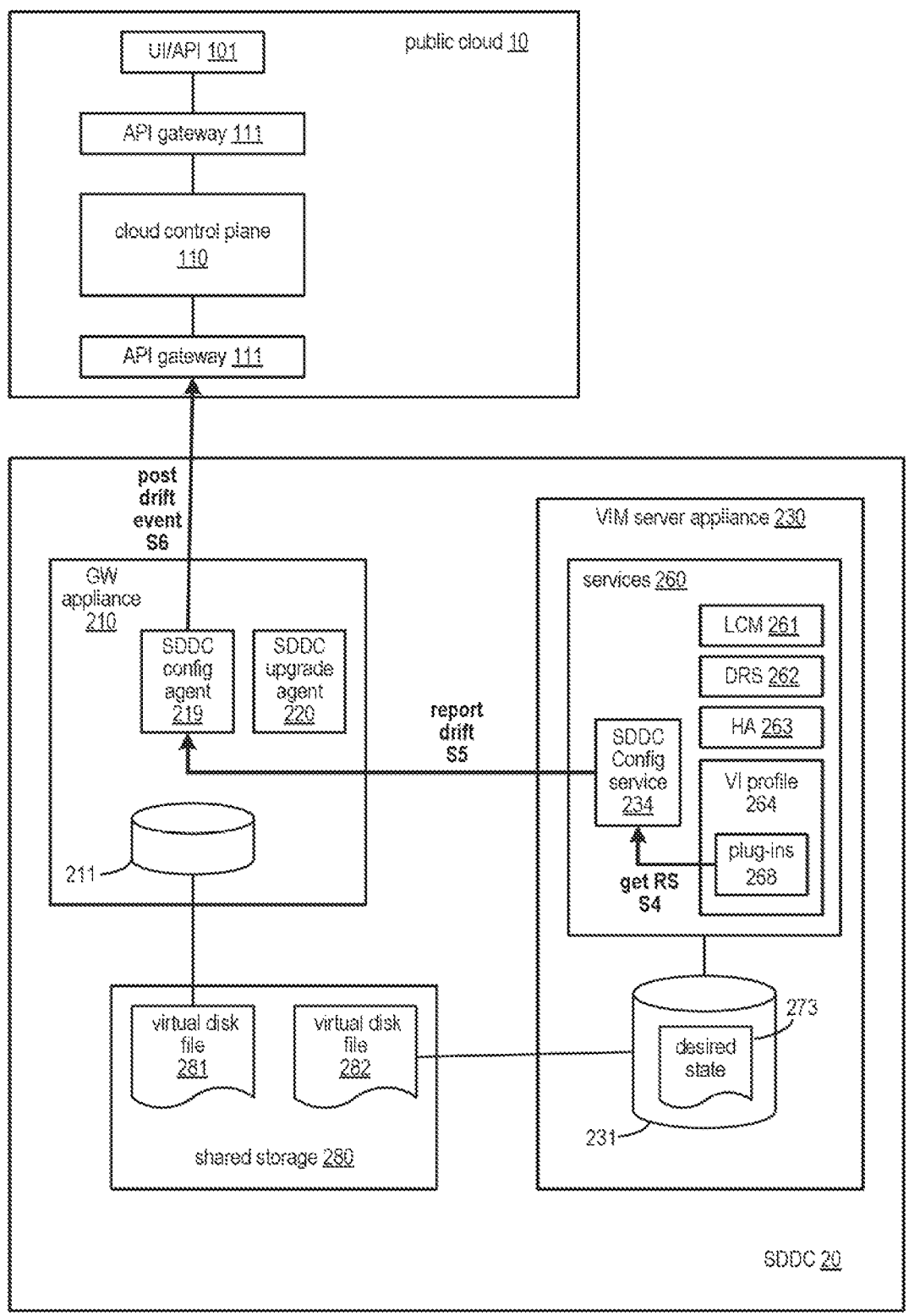
FIG. 7B is a conceptual diagram illustrating the process of determining drift of the running state of the management cluster from its desired state.

FIG. 7B is a conceptual diagram illustrating the process of determining drift of running state of the management cluster from the desired state of the management cluster according to embodiments. This process may be initiated from cloud control plane 110 as part of a compliance check described above in conjunction with FIG. 6 or may be carried out periodically by SDDC configuration service 234. At step S4, SDDC configuration service 234 instructs DRS service plug-in 268 to get the running state of the management cluster, compares the running state against the desired state specified in desired state document 273. If, as a result of the comparison, SDDC configuration service 234 detects drift of the running state from the desired state, SDDC configuration service 234 at step S5 notifies SDDC configuration agent 219 of the drift. Then, SDDC configuration agent 219 sends a notification of the drift event to cloud control plane 110 (Step S6).

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of reserving hardware resources for management appliances of a software-defined data center (SDDC) that have been deployed onto one or more hosts of a cluster of hosts, said method comprising:
   reserving hardware resources of the cluster for a first resource pool and a second resource pool, the hardware resources of the cluster including at least processor resources of the hosts of the cluster and memory resources of the hosts of the cluster; and
   assigning the management appliances to the first resource pool and assigning workload virtual machines (VMs) to the second resource pool,
   wherein the management appliances share the hardware resources of the cluster with the workload VMs and, based on said reserving and said assigning, the management appliances are allocated at least hardware resources that have been reserved for the first resource pool, and
   wherein the management appliances include a virtual infrastructure management (VIM) server appliance in which VIM software for locally managing the SDDC is installed, and the VIM software locally manages the cluster and other clusters of hosts.

2. The method of claim 1, wherein the management appliances include a gateway appliance in which agents of cloud services that centrally manage the SDDC, are installed.

3. The method of claim 2, wherein
the hardware resources reserved for the first resource pool satisfy at least the resource requirements of the gateway appliance and two times the resource requirements of the VIM server appliance.

4. The method of claim 3, further comprising:
reserving the hardware resources of the first resource pool separately for each of the management appliances.

5. The method of claim 2, wherein
one of the cloud services is a cloud service that centrally manages a configuration of the SDDC, including a configuration of the cluster, according to a desired state of the cluster, the desired state of the cluster specifying an amount of hardware resources to be reserved for the first and second resource pools.

6. The method of claim 5, wherein
one of the agents is a configuration agent that retrieves the desired state of the cluster from a cloud control plane and communicates the desired state of the cluster to the VIM server appliance.

7. The method of claim 6, further comprising:
remediating a running state of the cluster according to the desired state of the cluster.

8. The method of claim 6, further comprising:
determining that a running state of the cluster differs from the desired state of the cluster; and
notifying the configuration agent that the running state of the cluster differs from the desired state of the cluster.

9. The method of claim 1, wherein
the VIM software provides a distributed resource scheduling (DRS) service, and the DRS service performs load balancing of the workload VMs in such a manner that the second resource pool is guaranteed hardware resources that have been reserved for the second resource pool.

10. The method of claim 9, wherein
the VIM software further provides a high availability service and the second resource pool is a resource pool for the high availability service, and
the hardware resources reserved for the second resource pool, for the high availability service, satisfy at least the resource requirements of workload VMs for which the high availability service has been enabled.

11. A non-transitory computer readable medium comprising instructions to be executed in a computer system to carry out a method of reserving hardware resources for management appliances of a software-defined data center (SDDC) that have been deployed onto one or more hosts of a cluster of hosts, said method comprising:
reserving hardware resources of the cluster for a first resource pool and a second resource pool, the hardware resources of the cluster including at least processor resources of the hosts of the cluster and memory resources of the hosts of the cluster; and
assigning the management appliances to the first resource pool and assigning workload virtual machines (VMs) to the second resource pool,
wherein the management appliances share the hardware resources of the cluster with the workload VMs and, based on said reserving and said assigning, the management appliances are allocated at least hardware resources that have been reserved for the first resource pool, and
wherein the management appliances include a virtual infrastructure management (VIM) server appliance in which VIM software for locally managing the SDDC is installed, and the VIM software locally manages the cluster and other clusters of hosts.

12. The non-transitory computer readable medium of claim 11, wherein
the management appliances include a gateway appliance in which agents of cloud services that centrally manage the SDDC, are installed, and
the hardware resources reserved for the first resource pool satisfy at least the resource requirements of the gateway appliance and two times the resource requirements of the VIM server appliance.

13. The non-transitory computer readable medium of claim 12, wherein
one of the cloud services is a cloud service that centrally manages a configuration of the SDDC, including a configuration of the cluster, according to a desired state of the cluster, the desired state of the cluster specifying an amount of hardware resources to be reserved for the first and second resource pools.

14. The non-transitory computer readable medium of claim 13, wherein said method further comprises:
remediating a running state of the cluster according to the desired state of the cluster.

15. The non-transitory computer readable medium of claim 13, wherein said method further comprises:
determining that a running state of the cluster differs from the desired state of the cluster; and
notifying an agent of the cloud service that centrally manages the configuration of the SDDC that the running state of the cluster differs from the desired state of the cluster.

16. A computer system including a cluster of hosts, on which management appliances of a software-defined data center (SDDC) are deployed, the management appliances including a virtual infrastructure management (VIM) server appliance in which VIM software for locally managing the SDDC is installed and a gateway appliance in which agents of cloud services that centrally manage the SDDC, are installed, wherein the VIM software is programmed to carry out a method of reserving hardware resources for the management appliances, said method comprising:
reserving hardware resources of the cluster for a first resource pool and a second resource pool, the hardware resources of the cluster including at least processor resources of the hosts of the cluster and memory resources of the hosts of the cluster; and
assigning the management appliances to the first resource pool and assigning workload virtual machines (VMs) to the second resource pool,
wherein the management appliances share the hardware resources of the cluster with the workload VMs and, based on said reserving and said assigning, the management appliances are allocated at least hardware resources that have been reserved for the first resource pool, and
wherein the VIM software locally manages the cluster and other clusters of hosts.

17. The computer system of claim 16, wherein
the VIM software provides a distributed resource scheduling (DRS) service, and the DRS service performs load balancing of the workload VMs in such a manner that the second resource pool is guaranteed hardware resources that have been reserved for the second resource pool.

18. The computer system of claim 17, wherein
the VIM software further provides a high availability service and the second resource pool is a resource pool for the high availability service, and
the hardware resources of the cluster reserved for the second resource pool, for the high availability service, satisfy at least the resource requirements of workload VMs for which the high availability service has been enabled.

\* \* \* \* \*